United States Patent [19]

Miller

[11] Patent Number: 4,692,250
[45] Date of Patent: Sep. 8, 1987

[54] SIMULTANEOUS C AND N BIO-OXIDATION WITH MULTI-STAGE RBC RECYCLING

[76] Inventor: Gary E. Miller, P.O. Box 2838, West Lafayette, Ind. 47906

[21] Appl. No.: 27,011

[22] Filed: Mar. 17, 1987

[51] Int. Cl.$^4$ .............................................. C02F 3/08
[52] U.S. Cl. ................................... 210/619; 210/622
[58] Field of Search ............... 210/614, 619, 622, 623, 210/626, 628, 903

[56] References Cited

U.S. PATENT DOCUMENTS

| Re. 29,970 | 4/1979 | Torpey | 210/619 |
| 3,557,954 | 1/1971 | Welch | 210/619 |
| 3,817,857 | 6/1974 | Torpey | 210/619 X |
| 4,093,539 | 6/1978 | Guarino | 210/150 X |
| 4,563,282 | 1/1986 | Wittman et al. | 210/619 |
| 4,608,162 | 8/1986 | Hankes et al. | 210/150 |
| 4,663,044 | 5/1987 | Goronszy | 210/619 X |

OTHER PUBLICATIONS

Smith et al "Proceedings: First National Symposium, Workshop on Rotation Biological Contactor Technology", Jun. 1980, vols. 1 and 2, containing the following articles:
E. D. Smith and J. T. Bandy, "A History of the RBC Process", pp. 11-26.
Shankha K. Banerji, "ASCE Water Pollution Management Task Committee Report on 'Rotation Biological Contactor for Secondary Treatment'", pp. 31-52.
C. C. Chou, R. J. Hynek, R. A. Sullivan, "Comparison of Full Scale RBC Performance with Design Criteria", pp. 1101-1125.
T. Viraraghavan, R. C. Landine, E. Winchester, & G. H. Jenkins, "Design and Operation of Two Rotating Biological Contactor Plants at Fundy Natl. Park, New Brunswick, Canada", pp. 1137-1146.
K. Ito and T. Matsuo, "The Effect on Organic Loading on Nitrification in RBC Wastewater Treatment Processes," pp. 1165-1175.
Hallvard Odegaard & B. Rusten, "Nitrogen Removal in Rotating Biological Contactors Without the Use of External Carbon Source," pp. 1301-1317.
Roy F. Weston, "Review of Current RBC Performance and Design Procedures" EPA Publication No.: EPA/600/2085/033, NTIS No.: PB85-180545, Published Mar. 1985, p. 138.
C. P. Leslie Grady, Jr. & Henry C. Lim "Biological Wastewater Treatment, Theory and Applications" (Marcel Dekker, Inc.) p. 760.
Joint Committee of WPCF and ASCE, "Wastewater Treatment Plant Design" (1977) (2d printing 1982) (Water Pollution Control Federation) pp. 309-312.

Primary Examiner—Tom Wyse

[57] ABSTRACT

An improved wastewater treatment process is provided which utilizes a rotating biological contactor (RBC) containing at least two stages as the secondary treatment phase. In such RBC, biological oxidation of carbonaceous and nitrogenous matter is accomplished simultaneously in a partially submerged aerated RBC arranged for multiple stage treatment. Wastewater being charged to the RBC is preliminarily subjected to particulate separation and admixing with biologically treated and the clarified effluent from the RBC at a rate sufficient to produce a wastewater feed to the RBC system which has approximately acceptable standards of SBOD$_5$ and NH$_3$-N. The process also features a high flow rate of the diluted wastewater through the RBC.

6 Claims, 3 Drawing Figures

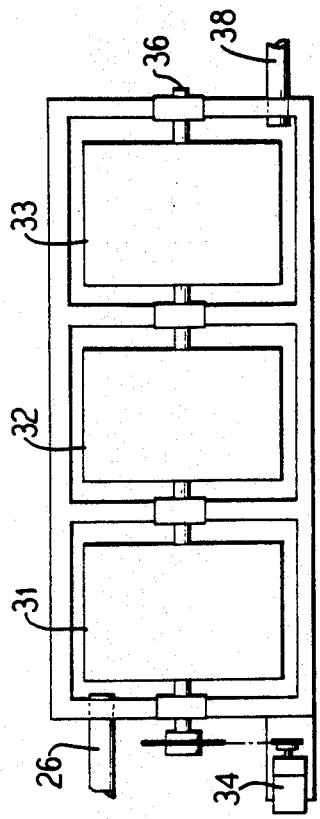
FIG. 3
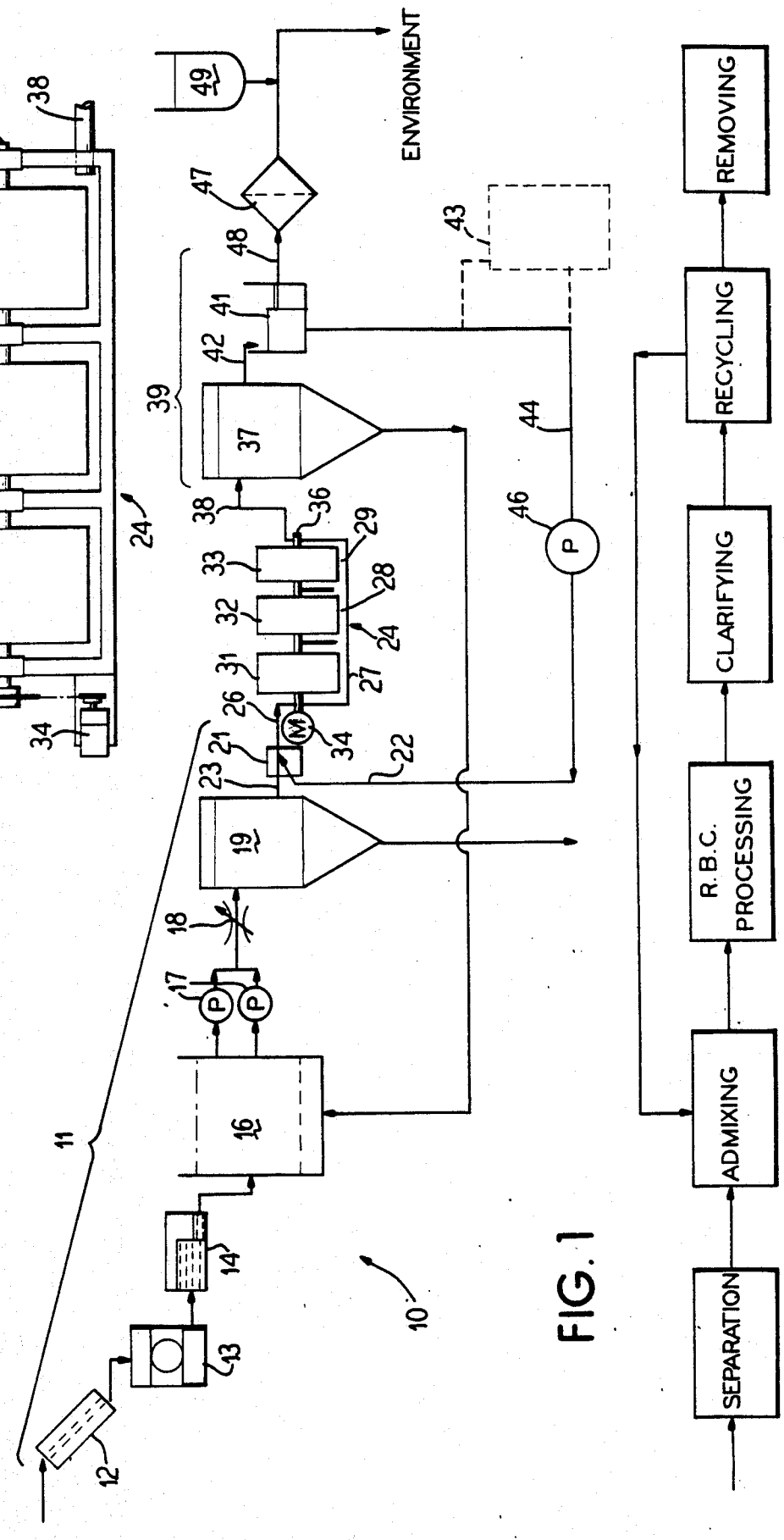
FIG. 2
FIG. 1

SIMULTANEOUS C AND N BIO-OXIDATION WITH MULTI-STAGE RBC RECYCLING

BACKGROUND OF THE INVENTION

1. Field of the Invention

The present invention lies in the field of processes for using rotating biological contactors in the biochemical treatment of wastewater for the removal of carbonaceous and nitrogenous pollutants.

2. Prior Art

In general, prior art biochemical wastewater treatment processes comprise two or three identifiable phases. An initial phase typically consists of the removal of grit and screenable material. In this phase, floatable and settable matter is removed through mechanical means. In a second phase, solutes in wastewater are converted biologically to microbial cells which are themselves floatable or settleable. These cells are subsequently removed mechanically in what may be considered to be a part of the secondary phase. If the secondary or biological treatment process is unable to meet required water quality standards, a so-called tertiary wastewater treatment process may be required for a given wastewater treatment system. Although such a tertiary process treatment may also involve biological conversion, it typically consists of physio-chemical processes in combination with stringent mechanical means.

The secondary (biological conversion) phase provides a means of bringing microbial organisms in the form of activated flocs or attached slimes into contact with the wastewater which provides the organisms with the required nutrients for proliferation. Some organisms are retained to continue the process, but the majority are subsequently separated from the resulting treated wastewater.

In the prior art, the rotating biological contactor (RBC) has gained attention for use in the secondary phase because of its relative simplicity in design and cost effectiveness. The RBC provides a biological contactor which is a medium fixed to a shaft that rotates and which is so positioned in an aerobic system as to cause the medium to be partically submerged in the wastewater. The medium (or contactor) provides a large surface area for microbial attachment. As the shaft rotates, the medium is alternately immersed and emersed in the wastewater, thereby providing exposure to the soluble nutrients and to atmospheric oxygen alternatively. Through the action of liquid sheer forces, or from a sequence of starvation and/or senescence of the innermost cells in thick slimes, excess biomass is regularly separated from these medium. In addition, through entrainment of air in the turbulence created as the medium is rotated through the fluid, the RBC imparts a degree of aeration which is important in keeping the microbial community viable.

Multistage RBC configurations have heretofore been employed in the secondary treatment phase and have been shown to provide generally better performance than a single stage reactor of equal volume. Multistage wastewater treatment systems utilizing partially submerged rotating biological contactors are shown and described, for example, in Welch, U.S. Pat. No. 3,557,954; Torpey, U.S. Pat. No. Re. 29,970; Hankes and Parker U.S. Pat. No. 4,608,162; and Smith et al "Proceedings: First National Symposium/Workshop on Rotating Biological Contactor Technology", Champion, PA, Feb. 4–6, 1980, sponsored by University of Pittsburg, U.S. EPA Municipal Environmental Research Laboratory, Cincinnati, Ohio, and the U.S. Army Construction Engineering Research Laboratory, Champaign, Illinois, June, 1980 (Vol. I and II).

As attention to water quality demands increasingly stringent discharge standards, the need for economical systems for meeting such standards becomes increasingly apparent.

Previously it has been proposed in the field of RBC process to employ recycling. For example, Wittmann et al U.S. Pat. No. 4,563,282 describe recirculation of effluent directly from an RBC back to the influent thereto. The returned wastewater is distributed to the down-rotation side of their RBC which is provided with cups and pockets, thereby "imparting additional rotation torque to the rotating biological contactor. Additional benefits are achieved through spreading the distribution of the circulating flow over a greater rotating biological contactor surface area." (see Wittmann et al '282 at column 4, lines 37–41), however nothing Wittmann et al teaches or suggests the use of clarified effluent for recirculation at high rate. Wittmann et al teach RBC use in combination with equipment used in an activated sludge process wherein suspended solids concentrations typically are greater than about 1500 milligrams/liter (mg/l) and $SBOD_5$ can be less than about 15 mg/l, depending on the sampling point.

For another example, the U.S. Environmental Protection Agency has recognized the use of recirculation of secondary clarifier effluent for purposes of providing flexibility in process operation; see, for example, the EPA brochure entitled "Rotating Biological Contactors (RBC's)—Checklist For A Trouble - Free Facility". However, such teachings do not suggest the use of recirculation as an integral and normal part of a wastewater treatment practice.

The wastewater treatment art needs new and improved process utilizing the RBC which can be employed effectively for the removal of both carbonaceous and nitrogenous material and which are characterized by a capacity to handle significant surges in contaminate levels in incoming wastewater.

BRIEF SUMMARY OF THE INVENTION

More particularly, the present invention relates to an improved wastewater treatment process which employs a rotating biological contactor supplied with wastewater diluted to approximately acceptable standards of prior art treated wastewater by a substantial recirculation of the effluent from a clarification device located after the final stage of the rotating biological contactor.

An object of the present invention is to provide an improved wastewater treatment process which avoids certain problems in the prior art methodology and which permits conventional rotating biological contactors to be used, if desired, either to upgrade existing secondary wastewater treatment, or, particularly with new construction, as an additional component of secondary wastewater treatment, thereby to provide the capacity to produce treated wastewater which meets the most stringent standards of water quality easily and efficiently.

Another object is to provide a wastewater treatment process utilizing rotating biological contactor technology wherein simultaneous oxidation of carbonaceous and nitrogenous solutes can be achieved with recycle and high flow rates.

Another object is to provide an alternative process to those currently used for the biological oxidation of carbonaceous and nitrogenous matter in wastewater which can be practiced using, if desired, conventional wastewater treatment apparatus in a reliable and economical manner.

Other and further objects, purposes, advantages, aims, utilities, features and the like will be apparent to those skilled in the art from a reading of the present specification taken together with the drawings.

BRIEF DESCRIPTION OF DRAWINGS

In the drawings:

FIG. 1 shows a simplified block diagramtic flowsheet of the process of the present invention;

FIG. 2 is a schematic and diagramtic representation of one embodiment of the process of the present invention; and FIG. 3 is a diagramtic side elevational view of one embodiment of an illustrative rotating biological contactor suitable for use in the practice of the process of the present invention.

DETAILED DESCRIPTION

In a preferred mode of practicing the present invention for wastewater treatment, a raw wastewater feed is used as a starting input stream which characteristically contains from about 50 to 500 milligrams per liter (mg/l) of suspended solids and preferably more than about 200 mg/l of suspended solids. Also such feed contains more than about 100 milligrams per liter of materials (compounds) measurable as soluble biological oxygen demand, and/or more than 15 milligrams per liter of dissolved ammonia-nitrogen compounds. Typical raw influents are derived from municipal waste streams, and the like.

In the prior art, such influent feeds have been treated in a wastewater treatment process scheme employing a rotating biological contactor. To provide for simultaneous oxidation of carbonaceous and nitrogenous solutes in the RBC, the conventional practice has been to provide sufficient surface on the rotating contactors particularly for the relatively faster growing organisms involved with the removal of carbonaceous nutrients especially in the earlier stages of a multistage RBC. As the wastewater progresses through the RBC, and the $SBOD_5$ level becomes low, these organisms are sufficiently starved to permit the relatively slower growing nitrifier organisms to become established so that the subsequent removal of the $NH_3$—N solutes is accomplished. Thereafter sufficient surface are is provided in successive stages to achieve the desired degree of ammonia-nitrogen oxidation.

In the inventive process, however, wherein substantial dilution of the effluent is accomplished (by recycling), both carbonaceous and nitrogenous solutes can be acted upon simultaneously within the RBC.

While, in the present process, the specific surface area associated with the rotating contactors of the RBC is, as done in the prior art, chosen by a consideration of the mass and/or volume of soluble biological oxygen demand ($SBOD_5$) and ammonia-nitrogen ($NH_3$—N) applied in the input stream (conveniently measured, for example, in pounds per day per 1000 square feet), in the present invention, in effect, the RBC system and the specific contactor surface area is sized according to the needs for ammonia removal only, thus potentially reducing such surface area requirements.

In the prior art, a current practice is to provide generally the same amount of contactor surface area in each stage of a multistage RBC system. If the influent to such RBC has a substantial $SBOD_5$ load, standard density media can be used to avoid media occlusion until nitrification can become established. Thereafter, high density media can be used due to the thin films characteristic of microbiological nitrification organisms. In the present process, which utilizes a dilute effluent, the more economical high density contactor media can be used throughout the individual stages of the RBC. Also, in the present process, the cost of the RBC system can be further controlled by reducing the size of each subsequent or succeeding stage following the first stage, thus maintaining approximately equal loadings per day per square foot within each stage so that a more sufficient use of the RBC equipment is achieved.

In the present process, the characteristically high rate of recycling utilized provides a stabilization in influent concentrations, for example, such as are associated with diurnal fluctuations in composition of municipal waste streams.

Also, the high rate of recirculation (recycling) makes the present process less likely to be adversely influenced by toxic substances present in the effluent screen owing to the diluted concentrations encountered.

In the case of municipal waste streams, by the present process, the recycling rate can, for example, range from around 5:1 to 15:1 based upon the volume of the resulting wastewater effluent from the mixing zone compared to the volume of the influent wastewater entering such zone. As indicated above, in addition to such a recycling rate, the present invention employs a high flow rate through the RBC system which substantially increases the shear forces as the wastewater stream undergoing processing passes over the bio-films associated with the rotating contactors, thus reducing such film thicknesses. Thin bio-films eliminate problems created in the prior art by the limited diffusion of nutrients from a wastewater stream into thicker films such as are associated with the first stages of rotating biological contactors. Thus, the process of the present invention is not nutrient limited.

In addition, the reduced bio-film thicknesses associated with the practice of the process of the present invention can substantially reduce the weight imposed by thicker biofilms onto the associated RBC equipment which reduces stress on such equipment and the potential for mechanical failure.

Also, the relatively high circulation rates of wastewater fluids through the RBC systems associated with the practice of the process of the present invention induce enhanced turbulence which is desirable because such increases the aeration capability of the RBC system. Also, since the bio-film is thinner, there is less per pass consumption of oxygen which furthers the aeration capacity. Since the present invention employs aerobic RBC systems, and since the performance of such aerobic RBC systems is directly related to the ability to achieve sufficient aeration, the present process provides greater wastewater treatment potential than in conventional (prior art) RBC processes.

In wastewater treatment, the dissolved (soluble) contaminating components are conveniently and conventionally considered to comprise mainly carbonaceous components and nitrogenous components. The quantity of soluble carbonaceous components is conveniently described in terms of its soluble biological oxygen demand (SBOD$_5$), while the quantity of the soluble nitrogenous components are conveniently described in terms of their ammonia-nitrogen (NH$_3$—N) content.

As indicated, prior art techniques for sizing rotating contactor surface area in a given RBC installation to be employed in the practice of the process of the present invention can be employed. For example, one common prior art method for sizing to consider the total so-called specific area of the entire RBC installation through which the wastewater is to be processed. The total specific contactor surface area provided by an RBC unit in a multistage group of RBC units comprising a given installation is dictated by the total mass of soluble biological oxygen demand (SBOD) components, and/or of ammonia-nitrogen (NH$_3$—N) components applied (measured in terms of pounds per day per 1000 square feet). Based on assumed loading rates, the individual unit areas are calculated. For example, one first would calculate the required surface area based upon the total SBOD$_5$ loading, and then calculate the required surface area based upon the soluble nitrogenous components (e.g., the NH$_3$—N content). Thereafter, one chooses the largest surface area so calculated. Such a calculation process is described, for example, by Poon, Chen, Smith, and Mikucki, in "Upgrading With RBCs For Ammonia-nitrogen Removal," J.W.P.C.F. 53(7), 1158 (1981). It is understood in the prior art that carbonaceous substrates were differentially consumed by, for example, heterotrophic bacteria, in successive stages until the SBOD$_5$ concentration is sufficiently low to retard cell proliferation. At this point, establishment of chemoautotrophic bacteria, or the like, which act upon the soluble nitrogenous wastes, can become established on the rotating contactors in an RBC.

In the present inventive process, various events are occurring. For one thing, a simultaneous oxidation of both soluble carbonaceous and soluble nitrogenous components is believed to be taking place because the carbonaceous solute concentration is not sufficient to support an overwhelming proliferation of heterotrophic bacteria in the initial RBC stages of the multistage aerobic RBC train.

For another thing, the sizing of an RBC installation can be more directly influenced by the anticipated through put of dissolved nitrogenous components.

For another thing, in a treatment of the wastewater from, for example, municiple sewage, short term variations in throughput ammonia concentration, for instance, through diurnal variation in water use, through storm surge, or the like, exert either a minimal or even no significant influence in effluent water quality.

For another thing, effluent standards such as are established by governmental regulatory bodies for SBOD$_5$ and NH$_3$—N are easily met or exceeded by practicing the process of the present invention, yet a given wastewater treatment RBC multistage train used in a wastewater treatment installation can be designed in accordance with good engineering practices and still have a reduced size and reduced cost compared to prior art practices. For example, the current National Pollutant Discharge Elimination System (NPDES) secondary effluent standards are 30 mg/l for total BOD, and 30 mg/l for suspended solids (SS). Currently, the NPDES does not list a standard for NH$_3$—N. Illustrative tertiary values are 1.0 mg/l for SS, 9.0 mg/l for soluble BOD$_5$, and 2.0 mg/l for soluble NHO$_3$—N.

As those skilled in the art understand, the five-day biological oxygen demand (BOD$_5$) is normally used to describe the BOD content of a given wastewater (using standard measuring techniques). Some persons skilled in the art prefer the use of soluble biological oxygen demand measurements as a measure of biological performance. Although there is some variance in valves, SBOD$_5$ is typically about 50% of BOD$_5$ values.

The process of the present invention may be understood by reference to FIG. 1. In a first process phase, particulates in a raw influent wastewater (having characteristics as described above) are separated to produce a starting clarified influent containing not more than about 200 mg/l of suspended solids and about 200 mg/l of BOD$_5$. The separation of particulates can be accomplished by any convenient procedure. Grit and large solid bodies are best removed in a preliminary separation procedure, as those skilled in the art will appreciate, particularly to reduce mechanical abrasion of process equipment. Commonly, in the art of wastewater treatment, a combination of various separation procedures is utilized with the choice of equipment and procedures in any given application situation being influenced by the type of raw influent wastewater to be processed. Although separation of floatable and settleable particulates is desired, but not necessary, in the practice of the present invention, the particular procedures for accomplishlng particulate separation in any given instance do not as such constitute a part of the present invention. A reason for particulate separation is that, in wastewater treatment, a fixed film water treatment device, such as a multistage RBC, has little or no effect upon solids, such as biological solids, like particulate BOD; see, for example, E. E. Cook and B. C. Wu in "Biotechnology and Bioengineering" 21, 2323 (1979). Thus, it is preferred in the practice of the present invention to remove particulates, such as particulate BOD solids, by physical means in the practice of the present invention, such means including, for examples, sedimentation, screening, settling, and/or the like before biological processing in the multistage RBC is undertaken. Preliminarily removed particulates generally display good compaction characteristics as is desirable in removal.

In a mixed process phase, the starting clarified influent from the particulate separation phase is admixed with added water at a rate which is at least sufficient to produce a diluted influent that is characterized by having:

(1) A concentration of dissolved organic compounds such that the biological oxygen demand of such diluted influent is below about 30 mg/l BODO$_5$ (or eguivalent), and (2) A concentration of dissolved ammonia-nitrogen compounds which is below about 5 mg/l.

Preferably, the SBOD$_5$ ranges from about 10 to 20 mg/l and preferably the ammonia-nitrogen (NH$_3$—N) ranges from about 1 to 2 mg/l.

In a next succeeding process phase, such resulting diluted influent is entered into and passed through successive stages of a multistage aerobic rotating biological contactor. Such RBC is characterized by having:

(a) At least two stages, and
(b) A capacity to maintain the quantity of dissolved oxygen present in each stage is at least about 2.0 mg/l of the diluted influent moving therethrough.

Preferably, the RBC contains at least 3 stages, and the square footage of media surface area of each stage is either substantially equal to the others thereof, or declines as one progresses from on stage to the next adjacent downstream stage.

The rate of passing of such diluted effluent through the successive stages of the multistage aerobic RBC is conveniently expressed as the hydraulic loading with respect to the RBC, and, for purposes of practicing the present invention, such RBC loading ranges from about 5 to 30 gallons of diluted effluent per square foot of total media surface area per 24 hour day, and preferably from about 10 to 25 (same units). The effluent from the final stage of such multistage aerobic RBC is a biologically treated water.

After passage through such RBC, the biologically treated effluent is clarified to produce a treated clarified effluent containing not more than about 30 mg/l of suspended solids, not more than about 30 mg/l of dissolved organic compounds which produce oxygen demand, and not more than about 5 mg/l of dissolved ammonia-nitrogen compounds. In general, after such clarification, the respective amounts of such dissolved biological oxygen demand organic compounds, of such dissolved ammonia-nitrogen compounds, and of such particulates are each at least about 10 weight percent less than in the diluted influent feed to the indicated RBC.

Particular clarification procedures, like the separating procedures above described, are well known to the prior art, and any given clarification procedure or combination thereof can generally be employed in the practice of the present invention. Clarification as such does not constitute a point of novelty in the present invention. However, because particulates are introduced during fluid passage through the RBC, clarification is provided after biologically treated effluent emerges from the RBC. These so introduced particulates commonly comprise materials of microbial origin, and such arise as a normal and natural part of biological treatment in a multistage aerobic RBC. If desired, similar equipment to that used in separation can be employed in clarifying, although coarse screening procedures are not necessary in order to accomplish clarification.

Preferably, the $BOD_5$ and $NH_3$—N contents of the clarified effluent are each at least about 25 weight percent less than the corresponding valves in the diluted influent to the RBC, and more preferably are at least about 50 weight percent, and can be substantially higher. The exact differential, as those skilled in the art will appreciate, is a matter which is dependent upon many process variables, including equipment design, variations in the raw influent wastewater, and the like.

What can be regarded as a succeeding phase after clarification is next undertaken in which a portion of the treated clarified effluent is fed back to the admixing phase, as hereinabove described. Such recycled stream is admixed with the starting clarified influent from the separating phase. Under normal steady state process operating conditions, the added water employed in the admixing phase for dilution is entirely derived by using recycled treated clarified effluent.

As those skilled in the art will appreciate, during start up conditions, emergency operating conditions, and the like, a portion of the water admixed with the clarified effluent from the separating phase can be derived from sources outside of the present process flow scheme. Conveniently, such temporary water sources include potable water from virtually any convenient local source.

Finally, treated wastewater is removed from the system. In effect, the removed treated wastewater can be regarded as the residual remaining after treated clarified effluent has been used as a source for recycled water. However, the rate of removal of treated wastewater under steady state operating conditions is approximately equal to the rate at which a starting clarified influent wastewater (as above described) is charged into the RBC system independently of the dilution.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE 1

Referring to FIG. 2, there is seen an embodiment of a wastewater treatment system 10 which is suitable for practicing the process of the present invention. System 10 includes a first stage generally designated by the numeral 11 wherein the raw influent wastewater is preliminarily processed to remove therefrom large primary solid bodies, grit, and, possibly, fats, oils, and greases. Specifically, in system 10, the raw influent is preliminary passed over course screens 12 to separate heavy particulates after which the influent wastewater is passed through a continuous grinder 13 to effectuate comminution of remaining particulates. Thereafter, the resulting influent is subjected to grit removal by passage through grit removal device 14 (a settling tank and the like) after which the resulting so treated wastewater is charged to a holding tank 16 which effectuates flow equalization. To prevent settling of residual particulates in holding tank 16, a mixing means must be provided, such as a stirrer or the like (not shown).

From holding tank 16 starting clarified influent is pumped by pumps 17 (here paired) through a flow meter 18 into a primary sedimentation zone, here shown as a tank having a conically tapered bottom region. Various conventional control devices (not shown) are functionally associated with flow meter 18 and pumps 17 to provide a desired continuous and uniform transfer of wastewater from tank 16 to tank 19. Typically about 50% of suspended solids present in the entering stream to tank 19 are removed in tank 19. Solids which collect in the bottom region of 19 are removed for sludge processing (considered conventional and not to be part of the present invention).

Clarified effluent from tank 19 is admixed with added water in mixing zone 21. As is hereinbelow described, under steady state operating conditions, the added water comprises a recycle stream which enters mixing zone 21 from a supply line 22 where it is admixed with starting clarified influent charged to mixing zone 21 via line 23. Under start-up conditions, emergency operating conditions, and/or the like, potable water from an outside source, alternatively, or in combination with, recycled fluid is charged to the zone 21 to make up a desired diluted influent which is charged into the first stage of rotating biological contactor system (RBC) 24 via line 26. The so diluted influent entering RBC system 24 has a composition generally as hereinabove described as respects $SBOD_5$ and $NH_3$—N. In the preferred system embodiment 10, three stages 27, 28 and 29 are successively employed in RBC 24 along the path of wastewater movement therethrough. The stages 27, 28, and 29 here have respective approximately equal media surface areas in each stage. The respective rotating contactors 31, 32 and 33 in stages 27, 28 and 29 are rotatably driven by a motor 34 which is functionally associated with a common drive shaft 36 upon which the individual contactors 31, 32 and 33 are fixed.

Effluent from the last stage of RBC system 24 is charged to a secondary sedimentation zone which is here illustrated by the sedimentation tank 37, the transfer from RBC 24 to tank 37 being accomplished by line 38, the effluent from RBC 24 being thus biologically treated.

The biologically treated effluent from the RBC 24 is, in effect, clarified in a next process treatment zone 39 which in the preferred embodiment shown comprises a sedimentation tank 37 which can be similar to tank 19 and a control discharge device 41, such as a weir containing tank. The device 41 receives effluent from the tank 37 via line 42.

Particulates collected in the sedimentation tank 37 bottom are conveniently fed back to the holding tank 16. Such a procedure, as those skilled in the art will readily appreciate, is considered to be advantageous since the settling characteristics of solids collected in sedimentation tank 37 can be enhanced when blended and settled with influent suspended solids in tank 19. Clarified effluent from device 41 is moved through line 44 by associated pump 46 to line 22 so that a portion of the treated clarified effluent is thus charged back to the mixing zone 21 which functions as hereinabove described.

Optionally, an additional equilization chamber 43 can be used to provide a buffer or reservoir against fluctuations in the influent stream entering zone 21, such as may be sensed by automatic control devices (not shown) which can be employed, if desired, as those skilled in the art will appreciate.

The effluent from the control discharge device 41 which is not so recycled to mixing zone 21 is charged to the optional, but preferred, microscreening device 47, thereby to effect filtration of such effluent (which reaches the microscreen filter 47 through line 48).

Optionally, but preferably, effluent from the microscreen filter 47 is disinfected by adding thereto an additive, such as, for example, chlorine from chlorine holding tank 49, before the process product wastewater is discharged to the environment. Ozone, UV light, or the like, can be similarly utilized. Under steady state operating conditions, the volume of treated water effluent discharged to the environment approximates volumetrically the rate at which influent water is taken into line 23.

EXAMPLE 2

For present illustrative purposes, the system 10 is considered to be operating with a raw influent wastewater being charged to tank 19 which contains, based upon 30 day averages, about 150 mg/l of suspended solids. The wastewater in tank 19 is further characterized by having a $BOD_5$ of about 150 mg/l. Also, such wastewater in tank 19 has a dissolved ammonia nitrogen content ($NH_3$—N) of about 15 mg/l. Such solutes like the suspended solids represent 30 day measured averages.

Under steady state operating conditions, sufficient recycled treated clarified effluent from clarification zone 39 is admixed with starting clarified influent in mixing zone 21 to produce in line 26 a diluted influent to RBC system 24 which is characterized by having a concentration of dissolved organic compounds such that the soluble biological oxygen demand falls in the range from about 10 to 20 mg/l and a concentration of dissolved ammonia-nitrogen compounds which falls in the range from about 1 to 2 mg/l, based upon 30 day averages.

The biologically treated effluent from the RBC system 24 after clarification (passage through clarification zone 39) is characterized by containing not more than about 30 mg/l of suspended solids, not more than about 30 mg/l of dissolved organic compounds of the type which produce biological oxygen demand, and not more than about 5 mg/l of dissolved ammonia-nitrogen compounds. Thus, the respective amounts of $BOD_5$ compounds and of ammonia-nitrogen compounds as solutes are reduced by approximately 80 percent in the treated clarified effluent compared to the starting clarified effluent.

The rotating biological contactor in the embodiment shown illustratively has approximately 100,000 square feet of total media surface area for all three stages which is divided approximately between each stage. The 0.25 million gallon per day wastewater passage rate through the RBC system 24 is accomplished at a rate such that the hydraulic loading with respect to such RBC system 24 is in the range from about 18–23 gallons of the dilute effluent per square foot of total media surface area per 24 hour day.

As is apparent from the foregoing specification, the invention is susceptible of being embodied with various alterations and modifications which may differ particularly from those that have been described in the preceding specification and description. For this reason, it is to be fully understood that all of the foregoing is intended to be merely illustrative, and is not to be construed or interpreted as being restrictive or otherwise limiting of the present invention, excepting as it is set forth and defined in the hereto-appended claims.

I claim:

1. In an improved wastewater treatment process for a raw influent wastewater containing from about 50 to 500 milligrams per liter of suspended solids, more than about 100 milligrams per liter of materials measurable as soluble biological oxygen demand, and/or more than about 15 milligrams per liter of dissolved ammonia-nitrogen compounds, wherein simultaneously and continuously the following processing steps are occurring:

(A) particulates are separated from said raw influent wastewater to produce a starting clarified influent, (B) such diluted influent is passed through successive stages of a multistage aerobic rotating biological contactor, said rotating biological contactor being characterized by having at least two stages and at least sufficient media surface area to reduce the soluble biological oxygen demand materials level and the amonia-nitrogen level to respective predetermined extents based upon assumed average clarified influent throughput rate, thereby to produce a biologically treated effluent, (C) said biologically treated effluent is clarified to produce a treated clarified effluent, and (D) said treated clarified effluent is removed as treated wastewater the rate of removal thereof being approximately equal to the rate at which said clarified influent is charged to said rotating biological contactor, said process further including the improvement which comprises the steps of:

(a) recycling a portion of said treated clarified effluent to said starting influent, (b) admixing said recycled effluent with said starting influent at a rate sufficient to produce a composite diluted influent containing not more than an average of about 30 milligrams per liter of suspended solids, not more than an average of about 30 milligrams per liter of dissolved organic compounds producing biological oxygen demand, and not more than an average of about 5 milligrams per liter of dissolved ammonia-nitrogen compounds, and (c) passing said composite diluted influent through said rotating biological contactor at a rate such that the hydraulic loading with respect to said rotating biological contactor ranges from about 5 to 30 gallons of said diluted influent per square foot of total media surface area per 24 hour day, said media surface area being such that, at said hydraulic loading, the respective amounts of said dissolved soluble biological oxygen demand organic compounds and of said dissolved ammonia-nitrogen compounds are each at least about 10 weight percent less than in said diluted influent before said passing.

2. The process of claim 1 wherein said diluted influent to said rotating biological contactor is characterized by having an $SBOD_5$ concentration ranging from about 10 to 25 mg/l and a concentration of dissolved $NH_3-N$ compounds which is in the range from about 1 to 2 mg/l.

3. The process of claim 1 wherein said rotating biological contactor is characterized by having at least 3 stages, and the total square feet of media surface area provided equals about 1000 square feet per either (a) 2 to 4 pounds of soluble biological oxygen demand materials, or (b) 0.1 to 0.2 pounds of ammonia-nitrogen compounds, treated per 24 hour day, whichever such material requires this greater said surface area, and said passing is conducted at a hydraulic loading ranging from about 10 to 20 gallons of said diluted influent per square foot of total media surface area per 24 hour day.

4. A wastewater treatment process for a raw influent wastewater containing more than about 200 milligrams per liter of suspended solids, more than about 100 milligrams per liter of materials measurable as soluble biological oxygen demand, and more than about 15 milligrams per liter of dissolved ammonia-nitrogen compounds, said process comprising the steps of simultaneously and continuously:

(A) separating particulates from said raw influent wastewater to produce a starting clarified influent containing not more than about 200 milligrams per liter of suspended solids, (B) admixing with said starting clarified influent sufficient added water at a rate at least sufficient to produce a diluted influent which is characterized by having (1) a concentration of dissolved organic compounds such that the biological oxygen demand of said diluted effluent is below about 30 milligrams per liter, and (2) a concentration of dissolved ammonia-nitrogen compounds which is below about 5 milligrams per liter, (C) passing said diluted influent through successive stages of a multistage aerobic rotating biological contactor, (1) said rotating biological contactor being characterized by having (a) at least two stages, and (b) a quantity of dissolved oxygen present in each stage which is at least about 1.0 milligram per liter of said diluted effluent moving therethrough, and (2) said passing being conducted at a hydraulic loading with respect to said rotating biological contactor ranging from about 5 to 30 gallons of said diluted influent per square foot of total media surface area per 24 hour day, thereby to produce a biologically treated effluent, (D) clarifying said biologically treated effluent to produce a treated clarified effluent containing not more than about 30 milligrams per liter of suspended solids, not more than about 30 milligrams per liter of dissolved organic compounds producing biological oxygen demand, and not more than about 5 milligrams per liter of dissolved ammonia-nitrogen compounds, (E) recycling a portion of said treated clarified effluent back to said step (B) at a rate sufficient to comprise said added water, and (F) removing as treated wastewater the residual said treated clarified effluent remaining after such so recycled portion is separated therefrom, the rate of removal being approximately equal to the rate at which said clarified influent enters said rotating biological contactor, the respective amounts of said dissolved soluble biological oxygen demand organic compounds and of said dissolved ammonia-nitrogen compounds each being at least about 10 weight percent less than in said diluted effluent.

5. The process of claim 4 wherein said diluted influent to said rotating biological contactor is characterized by having an $SBOD_5$ concentration ranging from about 10 to 25 mg/l and a concentration of dissolved $NH_3-N$ compounds which is in the range from about 1 to 2 mg/l.

6. The process of claim 4 wherein said rotating biological contactor is characterized by having at least 3 stages, and the total square feet of media surface area provided equals about 1000 square feet per either (a) 2 to 4 pounds of soluble biological oxygen demand materials, or (b) 0.1 to 0.2 pounds of ammonia-nitrogen compounds treated per 24 hour day, whichever such material requires this greater said surface area, and said passing is conducted at a hydraulic loading ranging from about 10 to 20 gallons of said diluted influent per square foot of total media surface area per 24 hour day.

* * * * *